Figure 1:
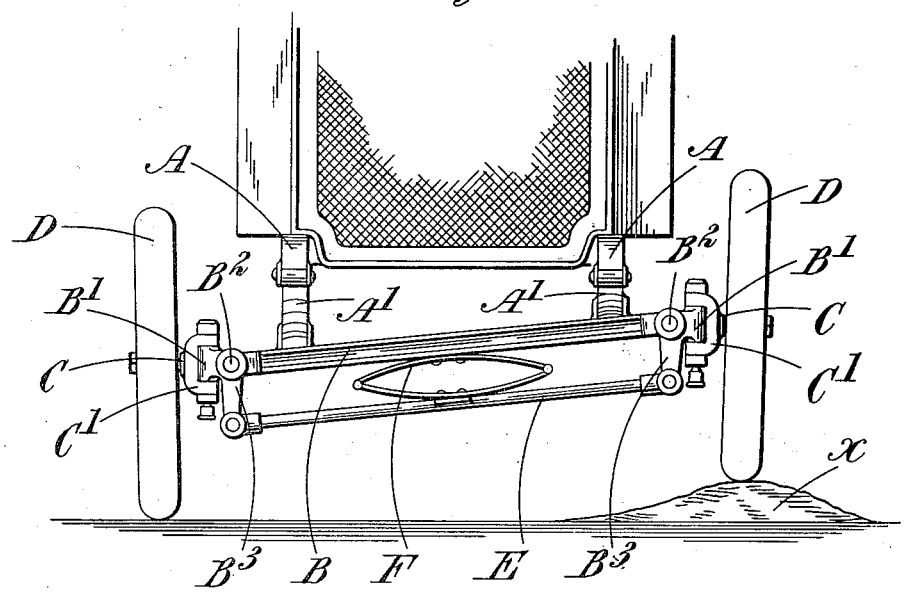

C. W. BICK.
SPRING SUSPENSION MECHANISM OF MOTOR VEHICLES.
APPLICATION FILED DEC. 21, 1912.

1,149,617.

Patented Aug. 10, 1915.
3 SHEETS—SHEET 1.

WITNESSES

INVENTOR

C. W. BICK.
SPRING SUSPENSION MECHANISM OF MOTOR VEHICLES.
APPLICATION FILED DEC. 21, 1912.
1,149,617.
Patented Aug. 10, 1915.
3 SHEETS—SHEET 2.
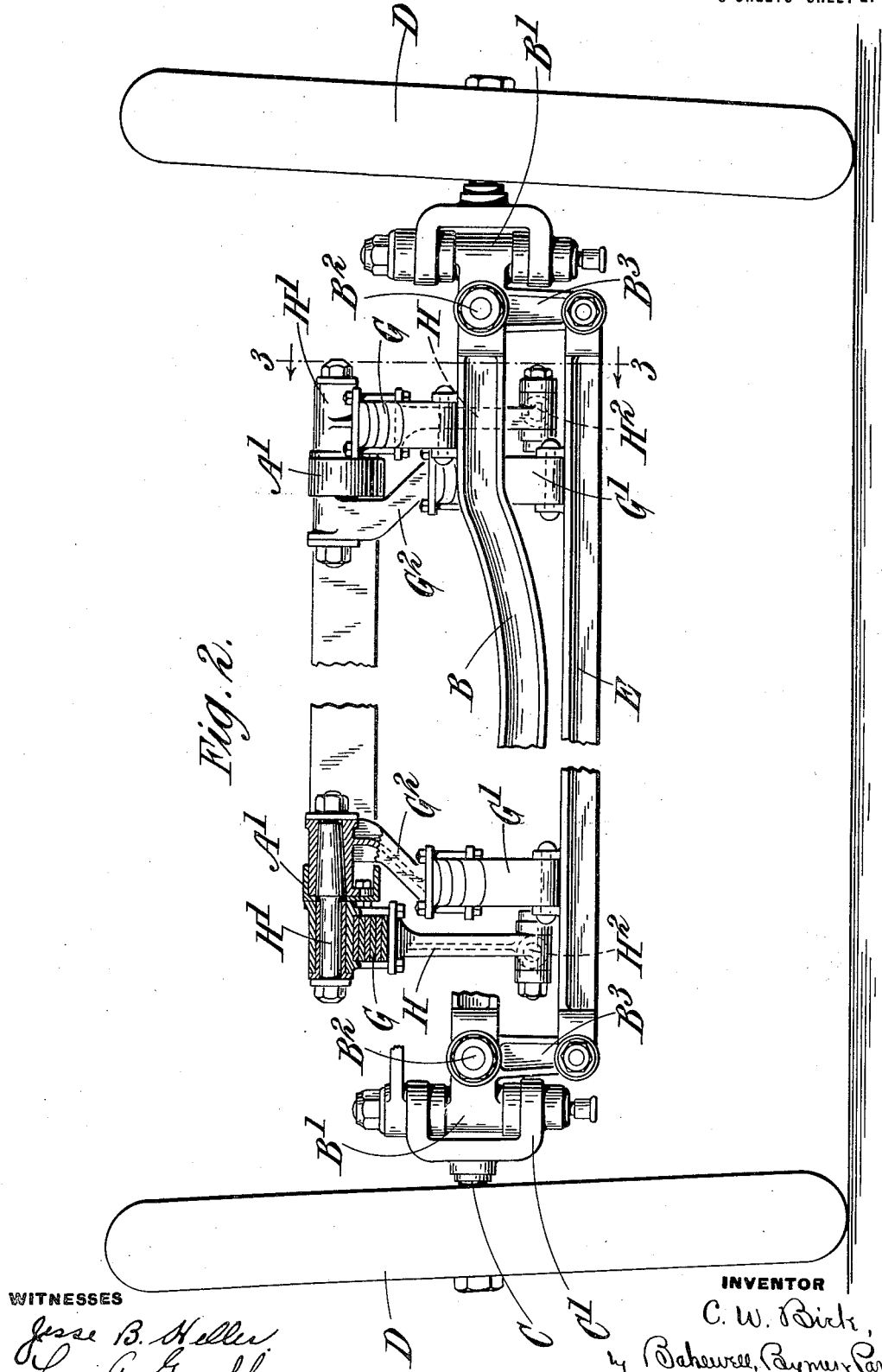

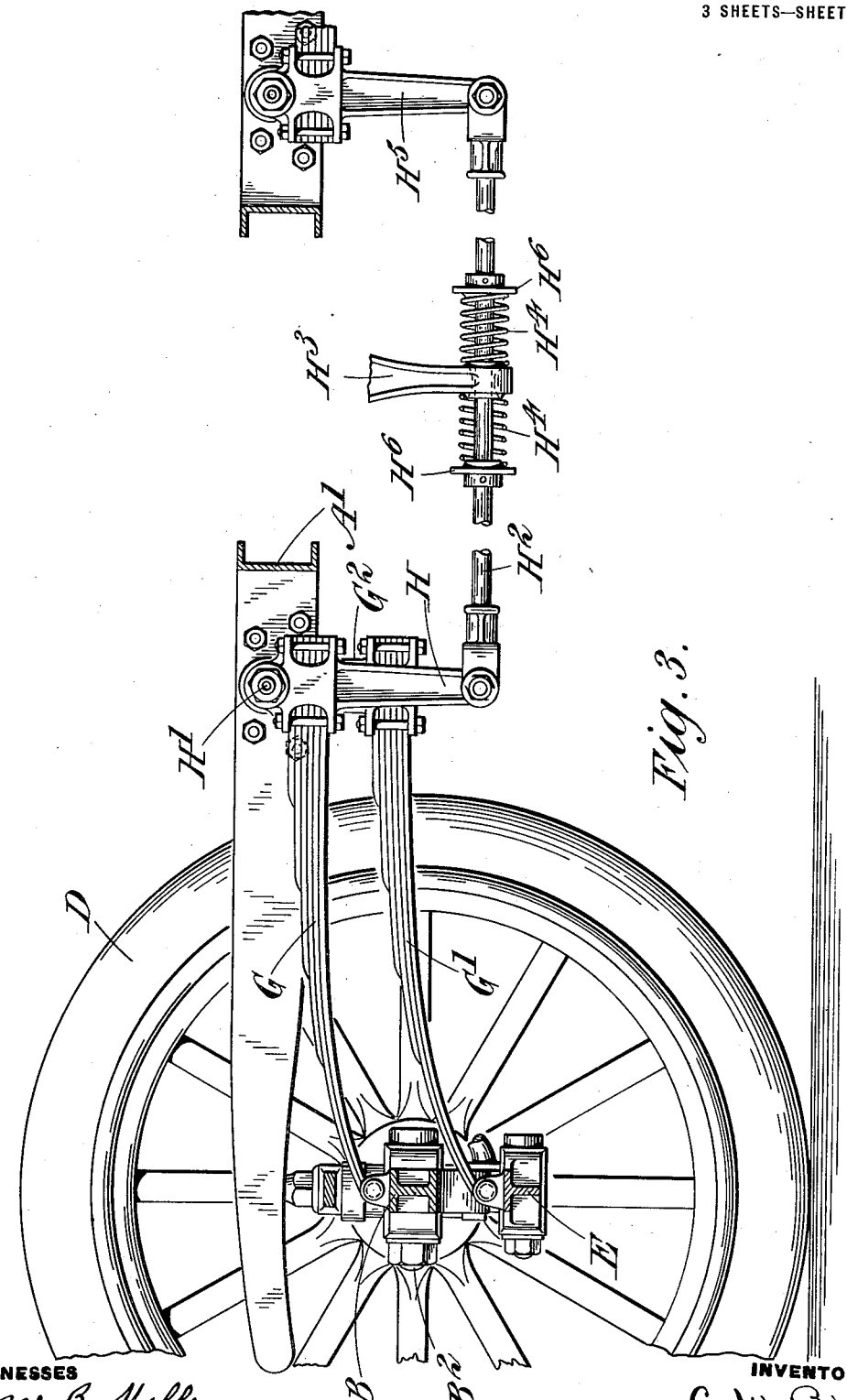

UNITED STATES PATENT OFFICE.

CHARLES WILLIAM BICK, OF LONDON, ENGLAND.

SPRING SUSPENSION MECHANISM OF MOTOR-VEHICLES.

1,149,617.          Specification of Letters Patent.       Patented Aug. 10, 1915.

Application filed December 21, 1912. Serial No. 737,965.

*To all whom it may concern:*

Be it known that I, CHARLES WILLIAM BICK, a subject of the King of England, residing at London, England, have invented certain new and useful Improvements in the Spring Suspension Mechanism of Motor-Vehicles, of which the following is a specification.

This invention is for improvements in or relating to the spring suspension mechanism of motor vehicles as applied to the steering-axle.

As is well-known the passage of one steering-wheel over an obstruction so that one wheel is vertically displaced relatively to the other by shock, causes a strain to be put on the steering mechanism in such manner that the vehicle momentarily swerves and then recovers its course again. This action is objectionable and the strain put by it on the steering mechanism is considerable; moreover it militates against the ease of steering.

According to the present invention there is employed with the steering-wheels carried on the usual stub-axles, guiding means so arranged that when one wheel is displaced in a vertical direction by shock, both are prevented from tilting laterally out of their normal vertical or approximately vertical positions.

It will be appreciated that when the steering-wheels are carried by stub-axles mounted in the usual manner upon the main steering-axle, both wheels are tilted laterally out of the vertical position when one passes over an obstruction, as the stub-axles and their connecting main axle all swing as one member about the point of contact between the wheel which is not vertically displaced, and the ground, and it is believed that this tilting causes the racking of the steering gear mentioned above. It is found that the steering is made considerably easier and the objectionable swerve of the vehicle is avoided, if while employing the connecting means ordinarily used between the steering-column and the steering-gear of the Ackermann type, the wheels are always kept in their proper vertical or approximately vertical positions by such guiding means as constitutes the subject-matter of the present invention.

The guiding-means may comprise interconnection between the two stub-axles so that both axles are prevented from being tilted about an axis longitudinal to the vehicle, although that axle carrying the wheel which is displaced by shock is moved bodily in a vertical direction.

According to one method of carrying out this invention, the steering-axle has at each end a portion which is hinged to swing in a vertical plane and carries the stub-axle. These end portions are connected by a transverse member (for example by each having a depending arm, which two arms are of equal length and are pivotally connected together by the transverse member) in such manner that angular displacement of one about its horizontal pivot would impart to the other equal angular displacement in the same rotary direction, and yielding-control is provided whereby the axle-ends after such displacement under shock are brought back to their normal alinement with the main body of the axle.

In certain types of suspension for steering-axles at present employed, the vertical movements of the steering axle relatively to the chassis are controlled by radius-arms or their equivalents, and the present invention further relates to the combination with guiding means such as is set forth above, of mechanism whereby the stub-axles are constrained against moving bodily about the axis or axes about which such radius-arms or their equivalents pivot. Thus the angular movement of the stub-axles about their own axes with its racking of the steering-gear, and the tilting of the road-wheels and such parts as tilt with them with its consequent racking of the steering-gear are both avoided.

In the accompanying drawings:—Figure 1 is a front elevation of a steering-axle showing diagrammatically an arrangement of parts according to the present invention; Fig. 2 is a front elevation of a steering-axle and its connected parts as arranged according to a preferred method of carrying out the invention, some of the parts being broken away for the sake of clearness, and Fig. 3 is a section on the line 3—3 of Fig. 2.

Like letters indicate like parts throughout the drawings.

In Fig. 1 the dumb-irons of the chassis are indicated at A, these being connected by any convenient form of spring A¹ to the main portion B of the steering-axle. This axle is provided with end-portions B¹ which receive the jaws C¹ of the stub-axles C whereon the road-wheels D are mounted, and these end-portions instead of being rigid with the axle B are pivoted thereto by pins B² whose axes are horizontal and transversely disposed relatively to the longitudinal axis of the main axle. Each end-portion B¹ has a depending arm B³ and these are connected together by a link E whose ends are pivoted to the ends of the said arms B³. The arms B³ are parallel to each other and are both of the same length so that it follows that the swinging of one stub-axle C about its pivot-pin B² will produce a corresponding displacement of the other stub-axle about its pivot B² in the same direction of rotation, and to hold the two stub-axles normally in proper alinement with the main axle B some controlling element is required such as the resilient connection indicated diagrammatically by the spring F, one part of which is made fast to the axle B and the other to the connecting-rod E.

With such an arrangement as is shown in Fig. 1, it will be seen that should the vehicle run over an obstruction such as is indicated at x, the wheel although displaced vertically will not be tilted laterally out of its vertical or approximately vertical position, as the parts B, B³ and E constitute a parallelogram which constrains the wheel to move laterally in a path parallel to itself. In other words, the equivalent of an angular displacement of each stub-axle about the pivots B² takes place relatively to the axle B, the main axle taking up the position shown in the drawing, while the stub-axle C at the left of the figure maintains its original position and the stub-shaft at the right of the figure is moved bodily up and also drawn in endwise slightly toward the center of the vehicle. This action of course deforms the spring F and as soon as the obstruction has been passed, or as soon as the spring F can recover from the immediate effect of the shock, it will again bring the main axle B and stub-axles C into their normal alinement.

The connection between the steering-column and the stub-axles may be such as is usually employed for steering mechanism of the Ackermann type and the invention has been found to give the required results with such usual steering connections as are commonly employed between the steering column and the Ackermann gear.

In Figs. 2 and 3 the mechanism for maintaining the vertical position of the steering-wheels is shown as applied to a known means of spring suspension of the radius-arm type, but so arranged that the parts which constitute the equivalents of the radius-arms are made to control the vertical movements of the steering-axle in such manner that no angular movement of the axle takes place, such as would result by its being swung bodily around the axis about which the radius-arms would swing.

The main axle B with the end-portions B¹, transverse connecting-rod E, and the directly associated parts, remain all as shown in Fig. 1, but the chassis is suspended from the main axle by a mechanism comprising leaf-springs G one on each side of the vehicle. As this mechanism is the same on each side, that on one side need only be described in detail. The root of the leaf-spring G is clamped in a member H which pivots upon a bolt H¹ rigidly secured to the side frame-member A¹ of the chassis. The spring G and member H thus constitute a bell-crank lever whereof the arm G is approximately horizontal and the arm H approximately vertical. With this form of suspension a similar bell-crank lever is employed for the rear axle, and the two depending arms are connected together each by a rod H² to a shock-absorbing device.

In Fig. 3 one of the shock-absorbing devices is shown diagrammatically as comprising a bracket H³ secured to the chassis midway between the fore and aft bell-crank levers and which constitutes an abutment for two springs H⁴ mounted on opposite sides of it. The rod H² passes through the bracket having the springs threaded on it and is pivoted at the rear of the vehicle to the arm H⁵ which constitutes the depending member of the bell-crank lever carrying the rear axle of the car. The horizontal arm of this bell-crank lever may be formed by a spring such as G and need not therefore be further illustrated or described. On the rod H² are two collars H⁶ against which the ends of the springs H⁴ remote from the bracket H³ abut. All the parts so far described with reference to this bell-crank suspension are known, and in addition to these parts, some form of radius-rod or its equivalent such as the leaf-spring G¹ has been employed, this usually being secured by its root in a bracket G² depending from the side frame-member A¹.

In applying such a suspension to the means already described for maintaining the steering-wheels in their vertical position when one passes over an obstruction, the leaf-spring G¹ instead of being hinged direct to the axle B is hinged to the transverse connecting-rod E. The effect of this combination of parts is that in addition to the lateral tilting of the road-wheels being prevented, the angular movement of the stub-axles which would take place if the axle B were allowed to rise and fall under the control of radius-rods, is avoided. For example, if the springs G alone were used and fixed rigidly to the frame-member A¹, these would constitute the equivalent of radius-rods and a certain amount of angular movement would be given to the stub-axles as they rose and fell, which militates against easy steering and tends to cause the car to swerve by dragging upon the steering connections.

Whatever form of the mechanism is employed for preventing the angular movement of the stub-axles when the axle is carried by some arrangement involving radius-rods or their equivalents, no claim is made in the present specification for such an arrangement *per se*, but it is believed to be new to combine such a mechanism with that described above for preventing tilting of the steering-wheels.

What I claim as my invention and desire to secure by Letters Patent is:—

1. A motor vehicle having steering wheels mounted on stub-axles, a support, a member pivoted to each end of said support to which the stub-axles are pivoted, said members being arranged to freely move about said pivot, a link connection between said members for moving one axle relative to the other to maintain both wheels approximately at right angles to the ground, and body supporting springs mounted on said support and forming the sole mounting therefor; substantially as described.

2. In a motor vehicle the combination of a steering-axle, springs connecting the steering-axle with the chassis, end-portions pivoted to the steering-axle about horizontal axes which are transverse to the longitudinal axis of the axle, stub-axles pivoted to these end-portions by vertical pivots, a transverse member connecting the two end-portions of the axle and movable relative thereto in such manner that angular displacement of one about its horizontal pivot would impart to the other equal angular displacement in the same rotary direction, and yielding control whereby the axle ends after the equivalent of such a displacement under shock are brought back to their normal alinement with the main body of the axle.

3. In a motor vehicle the combination of, a steering-axle, springs connecting the steering-axle with the chassis, bell-crank end-portions pivoted to the steering-axle about horizontal axes which are transverse to the longitudinal axis of the axle one arm of each bell-crank being so positioned as to constitute an extension of the axle, stub-axles pivoted to these extensions by vertical pivots, an endwise movable connecting-rod pivotally connecting the two free arms of the bell-cranks in such manner that angular displacement of one bell-crank about its horizontal pivot would impart to the other equal angular displacement in the same rotary direction, and yielding control whereby the said bell-cranks after the equivalent of said angular displacement under shock are brought back with their extensions in normal alinement with the main body of the axle.

4. In a motor vehicle the combination of, a steering-axle, springs connecting the steering-axle with the chassis, bell-crank end-portions pivoted to the steering-axle about horizontal axes which are transverse to the longitudinal axis of the axle one arm of each bell-crank being so positioned as to constitute an extension of the axle and the other two arms being disposed parallel to each other, stub-axles pivoted to the extension arms by vertical pivots, an endwise movable rod pivotally connecting the parallel arms at points which are equal in distance from the pivots about which the bell-cranks swing so that the extension arms are always kept parallel one with the other, and yielding control whereby the extension arms always tend to be brought into normal alinement with the steering axle.

5. In a motor vehicle the combination of, steering-wheels carried by stub-axles, springs operatively interposed between the stub-axles and the chassis of the vehicle so that the stub-axles can rise and fall relatively to the vehicle, controlling means for the stub-axles which means by itself would allow the stub-axles to rise and fall as when carried at the ends of radius-rods operatively connecting them to the chassis, further means for controlling the rise and fall of the stub-axles so that angular movement thereof during their rise and fall is prevented, and guiding means for the stub-axles so arranged that when one wheel is displaced in a vertical direction by shock both are prevented from tilting laterally out of their normal vertical or approximately vertical positions.

6. In a motor vehicle the combination of, a steering axle, yielding means connecting the steering-axle with the chassis in such manner that the steering-axle can rise and fall as when carried at the ends of radius-rods, further means for controlling the axle in its rise and fall so that no angular movement is imparted to it, end-portions pivoted to the steering-axle about horizontal axes which are transverse to the longitudinal axis of the axle, stub-axles pivoted to these end-portions by vertical pivots, a transverse member connecting the two end-portions of the axle in such manner that angular displacement of one about its horizontal pivot would impart to the other equal angular displacement in the same rotary direction, and yielding-control whereby the axle ends after the equivalent of such a displacement under shock are brought back to their normal alinement with the main body of the axle.

7. In a motor vehicle the combination of, a steering-axle, two leaf springs connected to opposite ends of the steering-axle each by one end, the other ends extending therefrom at right angles to the axle both on the same side and having operative connection with the chassis, bell-crank end-portions pivoted to the steering-axle about horizontal axes which are transverse to the longitudinal axis of the axle, stub-axles pivoted to these end-portions by vertical pivots, a transverse connecting-rod which pivotally connects the two free arms of the pivoted end-portions of the axle in such manner that angular displacement of one bell-crank end-portion about its horizontal pivot would impart to the other equal angular displacement in the same rotary direction, and two leaf-springs connected to opposite ends of the connecting rod by one end, the other ends extending from the same side of the rod as that upon which the springs extend from the axle, and having operative connection with the chassis, all four springs being disposed approximately parallel to each other and of approximately equal lengths, for the purpose described.

8. In a motor vehicle the combination of, a steering axle, two leaf-springs connected to opposite ends of the steering-axle each by one end, the other ends extending therefrom at right-angles to the axle both on the same side thereof, said springs constituting the horizontal arms of two bell-crank levers pivoted one on each side of the vehicle the other arms of which are connected to shock-absorbing devices, bell-crank end-portions pivoted to the steering-axle about horizontal axes which are transverse to the longitudinal axis of the axle whereof one arm is so positioned as to constitute an extension of the axle, stub-axles pivoted to these extension arms by vertical pivots, a transverse connecting-rod which pivotally connects the two free arms of the pivoted end-portions of the axle in such manner that angular displacement of one bell-crank about its horizontal pivot would impart to the other equal angular displacement in the same rotary direction, and two leaf-springs connected to opposite ends of the connecting-rod aforesaid by one end, the other ends extending from the same side of the connecting-rod as that upon which the springs extend from the axle and having operative connection with the chassis, all four springs being of approximately equal length and disposed approximately parallel to each other, for the purpose described.

9. In a motor vehicle, the combination of steering wheels carried by stub axles, a support for said axles, springs operatively interposed between the chassis of the vehicle and said support and forming the sole mounting therefor, and guiding means operatively connecting the stub axles and maintaining both wheels approximately at right angles to the ground; substantially as described.

In testimony whereof I have signed my name to this specification in the presence of two subscribing witnesses.

CHARLES WILLIAM BICK.

Witnesses:
A. M. HAYWARD,
HAROLD H. SIMMONS.